Figure 14:
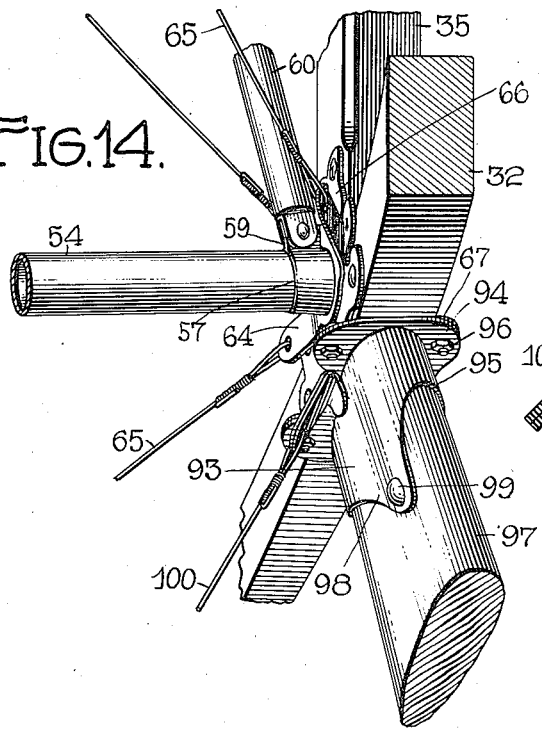

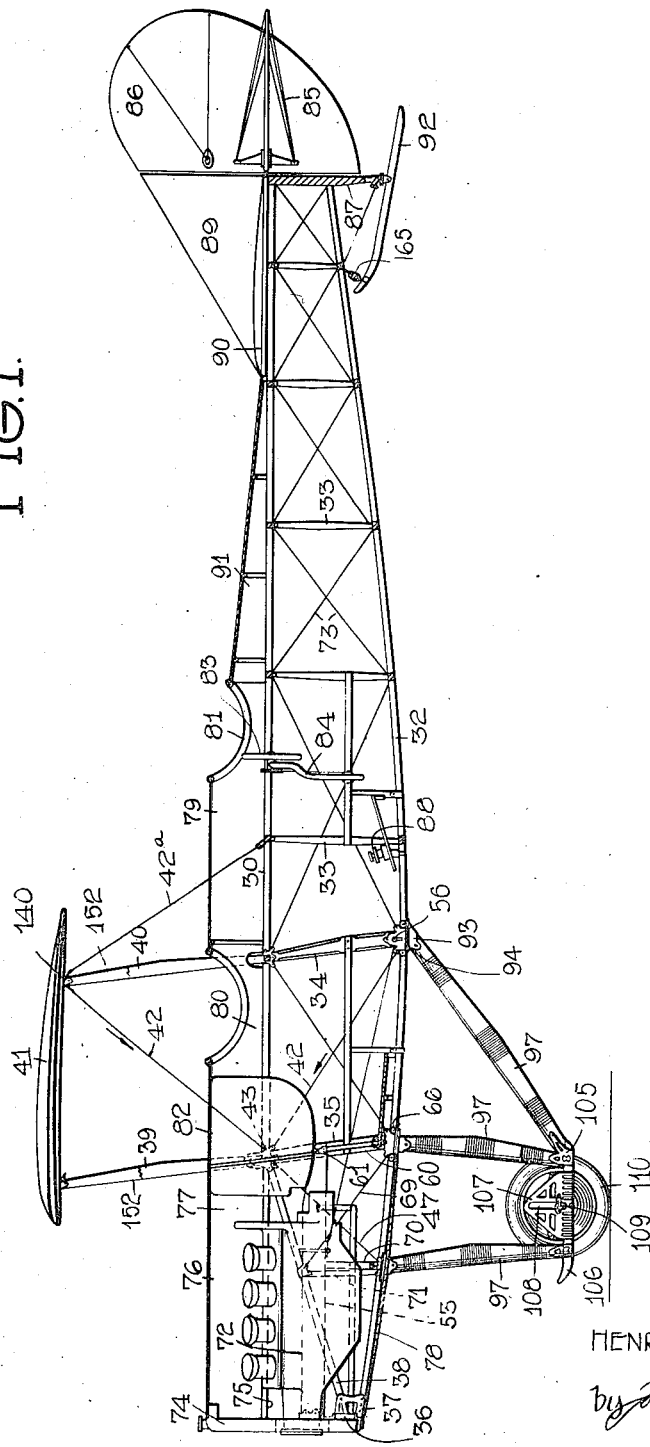

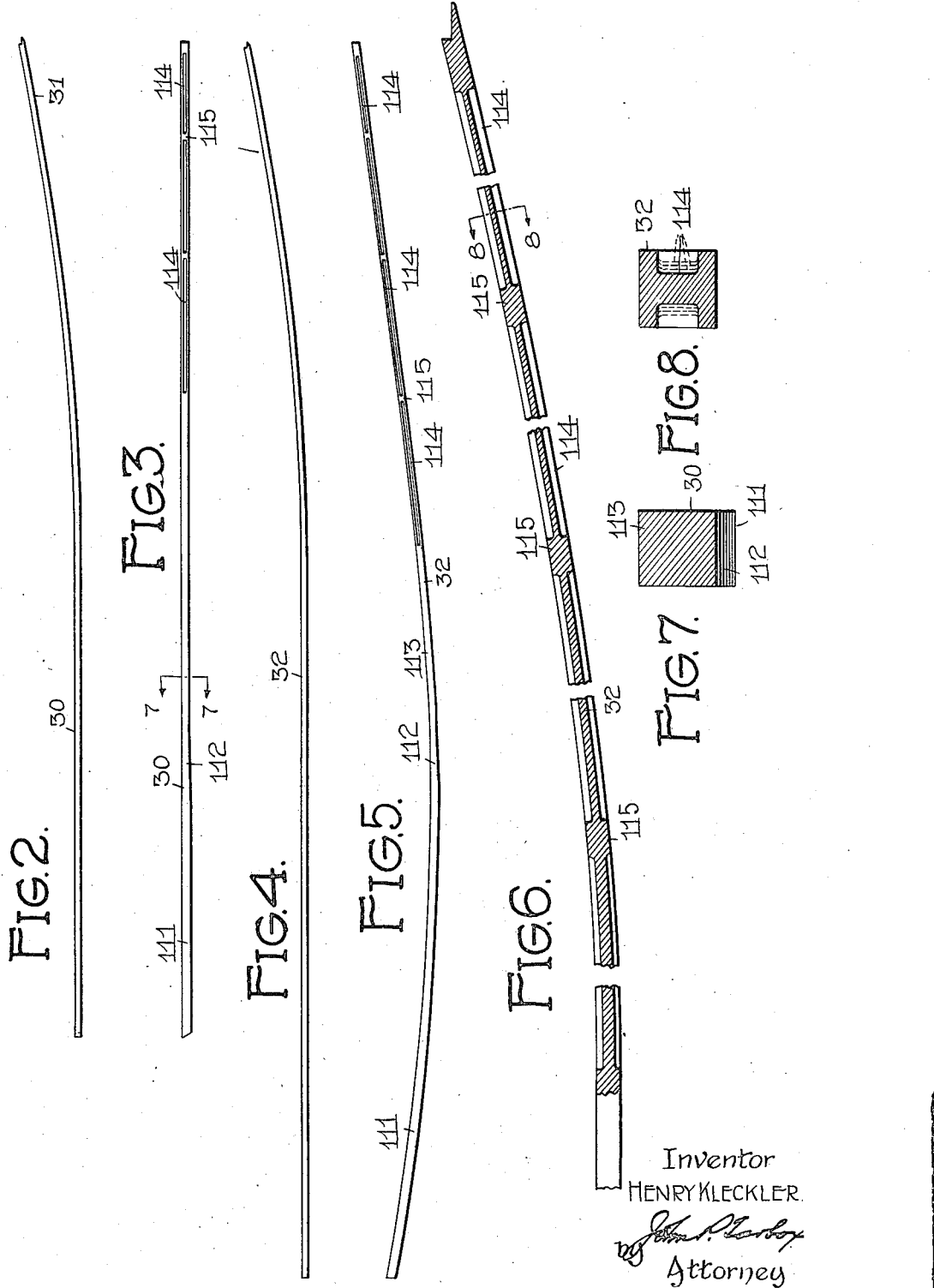

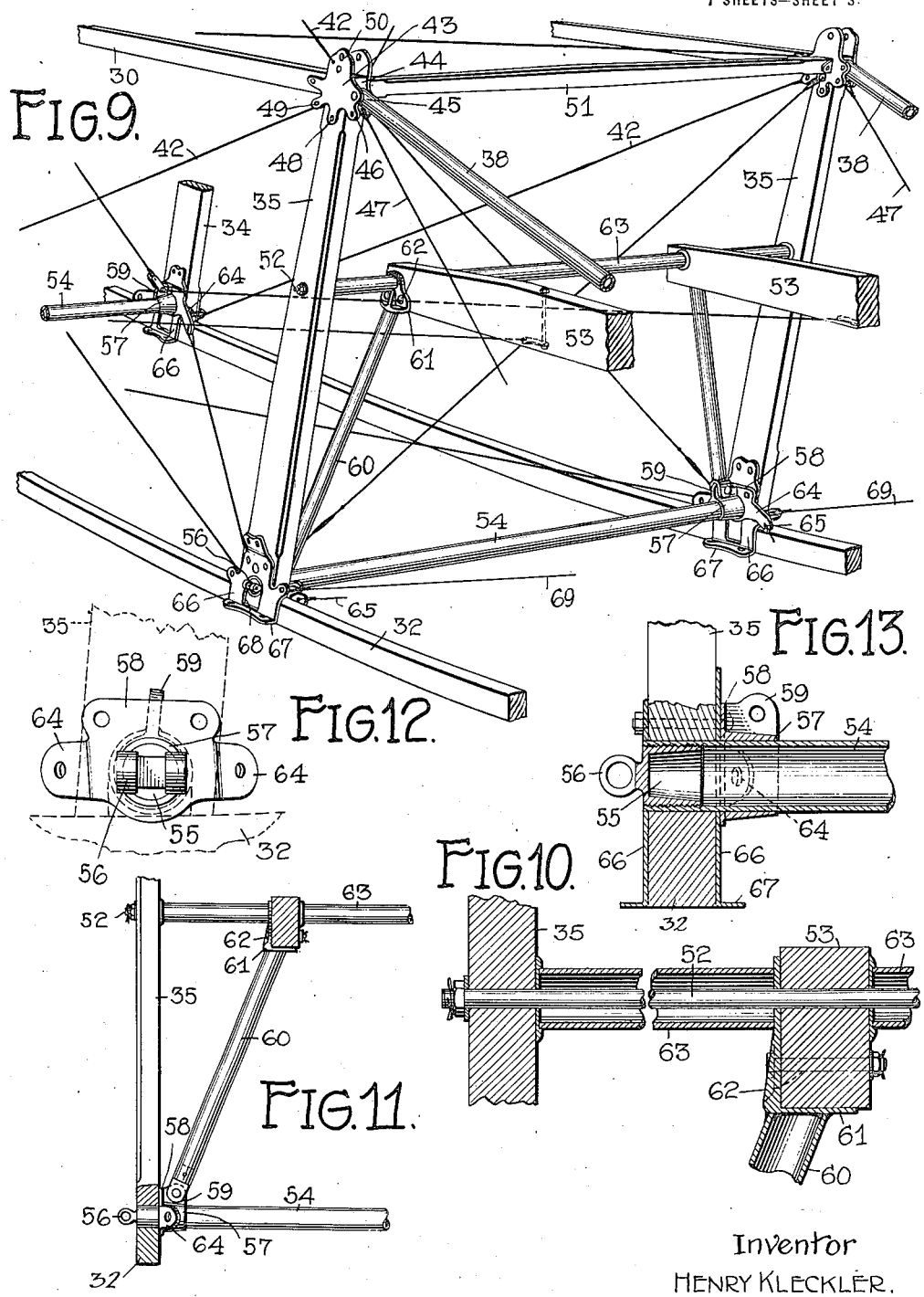

Inventor
HENRY KLECKLER
by
Attorney

H. KLECKLER.
FUSELAGE FOR AEROPLANES.
APPLICATION FILED SEPT. 21, 1915.
1,195,142.
Patented Aug. 15, 1916.
7 SHEETS—SHEET 5.
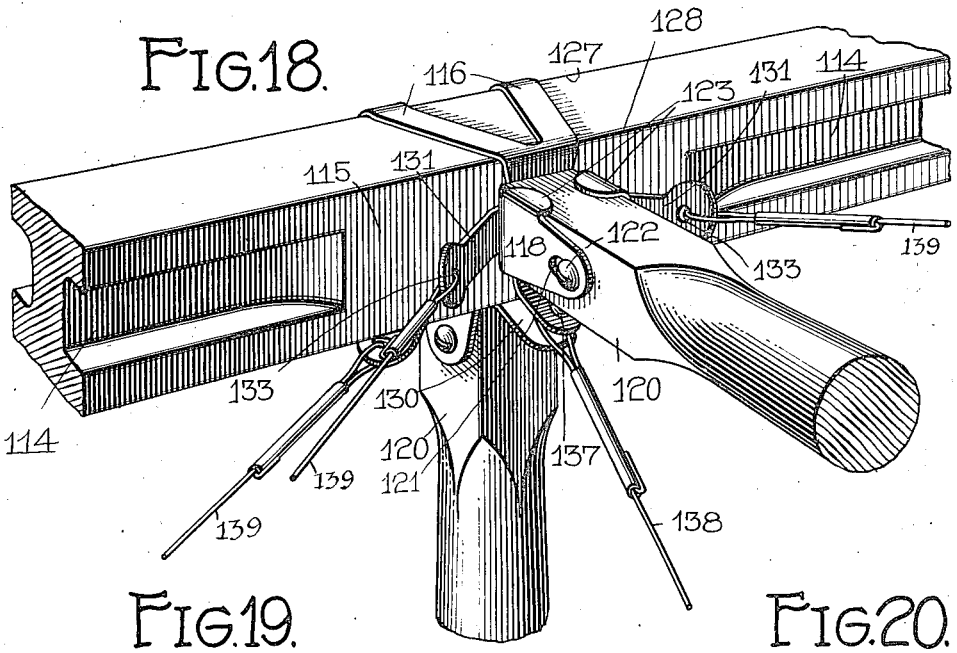
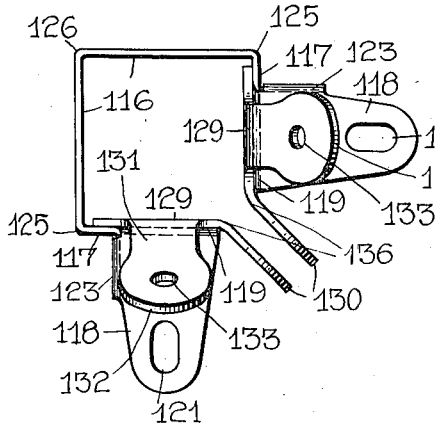
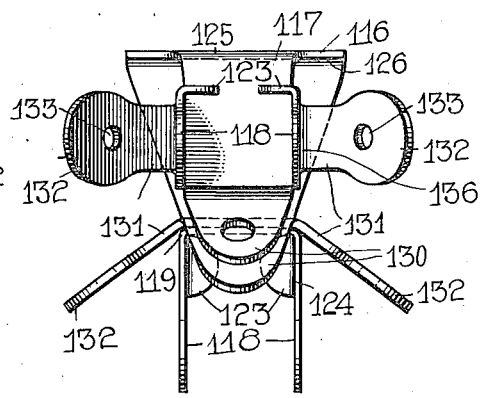
Inventor
HENRY KLECKLER
by
Attorney H. KLECKLER.
FUSELAGE FOR AEROPLANES.
APPLICATION FILED SEPT. 21, 1915.
1,195,142.
Patented Aug. 15, 1916.
7 SHEETS—SHEET 6.
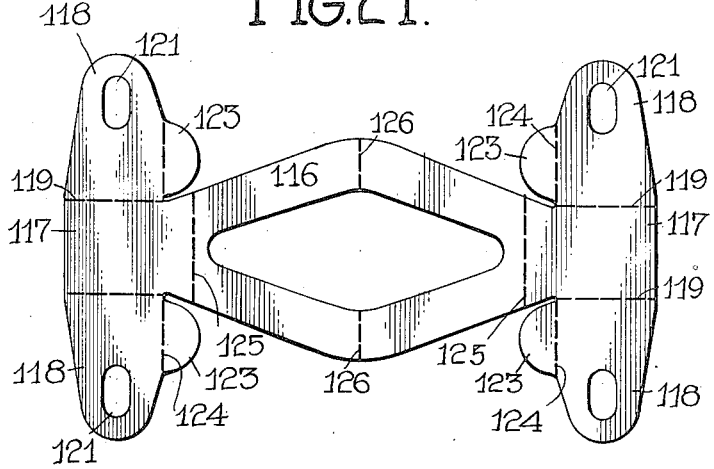
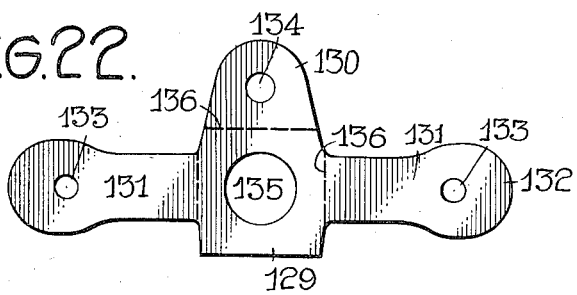
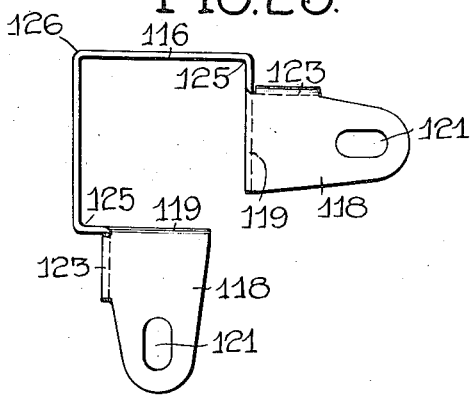
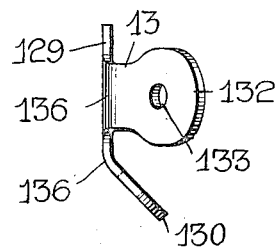
Inventor
HENRY KLECKLER.
by John P. Tarbox
Attorneys

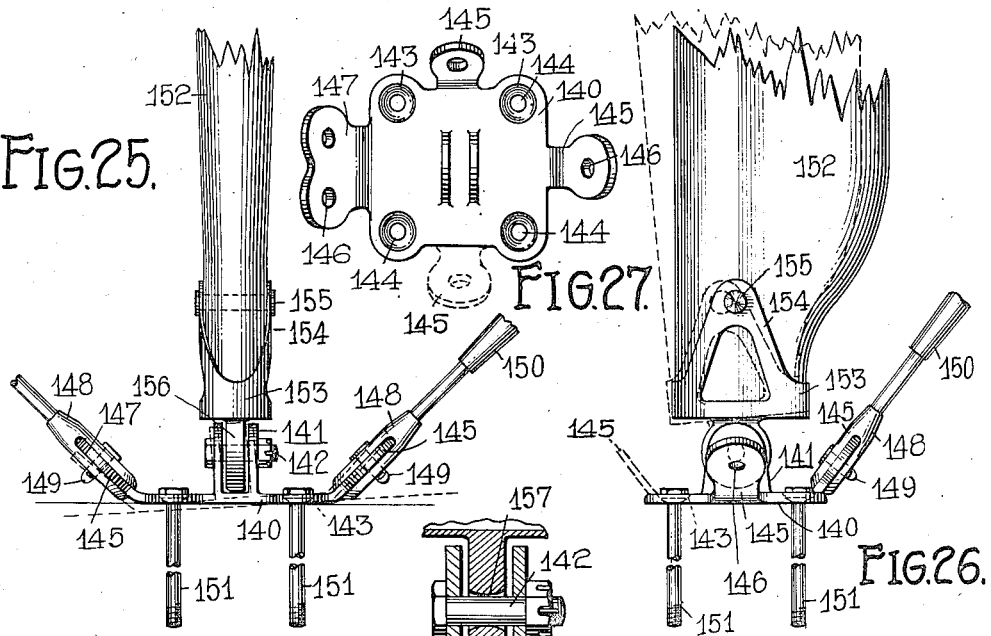
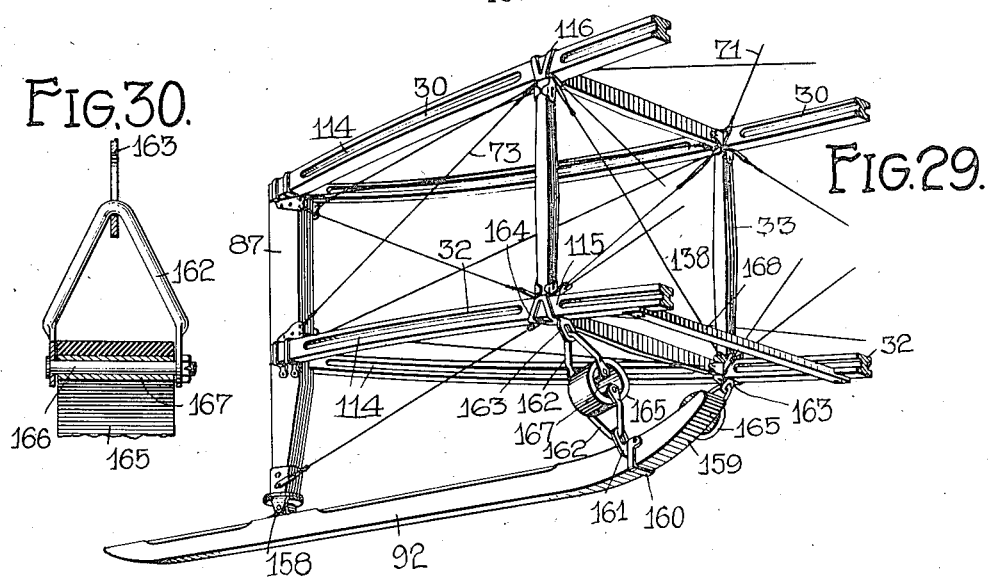

UNITED STATES PATENT OFFICE.

HENRY KLECKLER, OF BUFFALO, NEW YORK, ASSIGNOR TO CURTISS AEROPLANE & MOTOR CORPORATION, OF BUFFALO, NEW YORK, A CORPORATION OF NEW YORK.

FUSELAGE FOR AEROPLANES.

1,195,142.

Specification of Letters Patent. Patented Aug. 15, 1916.

Application filed September 21, 1915. Serial No. 51,775.

*To all whom it may concern:*

Be it known that I, HENRY KLECKLER, a citizen of the United States, residing at Buffalo, in the county of Erie and State of New York, have invented certain new and useful Improvements in Fuselage for Aeroplanes, of which the following is a specification.

This invention relates to heavier-than-air flying machines, and more particularly relates to the specific fuselage of such machine as embodied in what is known as the "tractor type".

As a principal object it is contemplated by this invention to secure a maximum factor of safety in aeroplane construction, and to employ means to this end entailing the minimum, only, of weight. This is, of course, a prime desideratum in the construction of all air craft, but the aeroplane constructions heretofore evolved have not attained a maximum degree of success in this direction. The present invention discloses means whereby the operative efficiency of flying machines may be enhanced as a whole by various departures from the customary practice in arrangement and detail construction, each such departure simplifying the arrangement to which it pertains, and the final assemblage being productive of the strong, efficient and relatively light machine desired.

A more specific object is to reorganize the draft system of a tractor aeroplane by connecting the engine bed support directly to the main supporting structure through the medium of rigid draft bars. As reorganized, the draft system includes means rendering forward thrust of the tractor effective upon the theoretical center of resistance, such effective thrust being transmitted to the supporting surfaces of the machine by respective portions of a draft yoke connecting with said means at the center of resistance.

A further object is to eliminate piercing of the wooden longerons and the struts of the fuselage for attachment to each other, the former necessity for this being obviated by the provision of fittings attached to clampingly connect intersecting wooden parts and to provide suitable anchorages for the bracing wires or cables.

A still further object and one related to that immediately preceding, is to construct the mentioned fittings with such common characteristics as to permit universal application of a few fixed types to all the desired fuselage connections, thus materially reducing manufacturing costs.

It is an object comprehending in scope all the foregoing to evolve an assemblage of parts which shall consider the fuselage wing posts as the basis of construction, the supporting surfaces for the aeroplane being erected directly thereover and connected therewith, the engine bed being rearwardly supported by such posts, the draft frame being rigidly connected thereto and subsequently to the supporting surface structure, and the running or landing gear being braced directly to the posts and to the draft frame.

The above and additional objects are accomplished by such means as are illustrated in the accompanying drawings described in the following specifications and then more particularly pointed out in the claims, which are appended hereto and form a part of this application.

Figure 15:
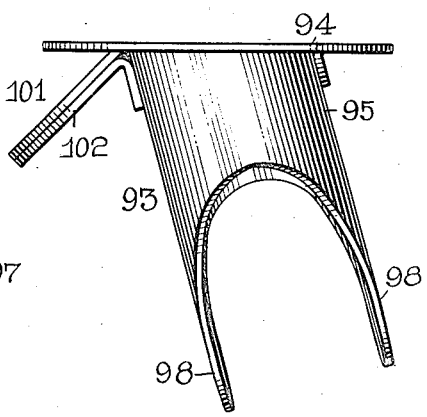
Figure 16:
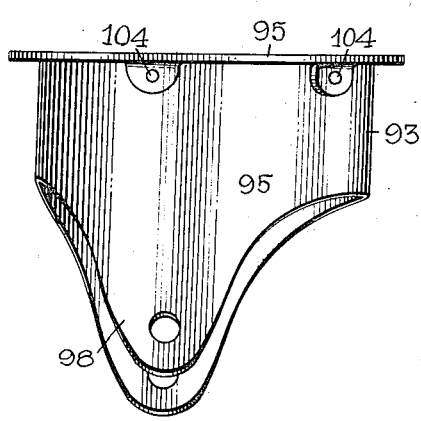
Figure 17:
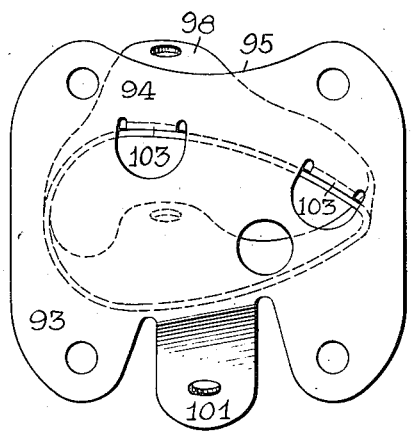

With reference to the drawings wherein there is illustrated the preferred embodiment of this invention, both as to detail and as to assemblage, and throughout which like characters of reference designate similar parts; Figure 1 is a view of an aeroplane fuselage with the outer "skin" removed. Fig. 2 is a plan view of an upper longeron of the fuselage. Fig. 3 is a side elevation of the upper longeron. Fig. 4 is a plan of a lower longeron. Fig. 5 is a side elevation of the lower longeron. Fig. 6 is an enlarged, fragmentary, horizontal view of a lower longeron. Fig. 7 is a transverse, sectional view, taken on the line 7—7 of Fig. 3. Fig. 8 is a similar view taken on the line 8—8 of Fig. 6. Fig. 9 is a fragmentary, perspective view showing portions of the engine bed construction and of the draft rigging. Fig. 10 is a partial longitudinal section through the tubular support connecting the fuselage wing posts for the rearward support of the engine bed. Fig. 11 is a transverse section through the one side of the engine bed, showing parts in elevation. Fig. 12 is a face view of the fitting carried by the engine section wing posts for the hinge connection of the outstanding wings. Fig. 13 is a vertical sectional view through the fitting of Fig. 12. Fig. 14 is a perspective view, from below, of a lower longeron showing the connection of one of the running gear posts thereto. Fig. 15 is a detail end elevation of the socket employed in the connection of Fig. 14. Fig. 16 is a side view of the socket. Fig. 17 is a plan view thereof. Fig. 18 is a perspective detail of a longeron portion having connected thereto both a vertical and a horizontal strut, by the novel clamp fitting of this invention. Fig. 19 is a side elevation of the clamp and its fitting removed. Fig. 20 is a front elevation thereof. Fig. 21 is a plan view of the blank from which the clamp may be struck up. Fig. 22 is a view of the blank for a fitting employed in conjunction with the clamp. Fig. 23 is a side view of the clamp per se. Fig. 24 is a side view of the fitting per se. Fig. 25 is a front elevational view of a wing post socket especially provided by this invention. Fig. 26 is a side elevation of the same subject matter. Fig. 27 is a plan view of the socket per se. Fig. 28 is an enlarged vertical sectional detail of the socket ears. Fig. 29 is a perspective view of the tail portion of the fuselage, showing the manner of resiliently mounting the tail skid, and Fig. 30 is a detail sectional view taken through a portion of this yieldable mounting.

In undertaking detail description of the fuselage construction provided by this invention, reference will first be had to Figs. 1-8 inclusive, illustrative of the longeron details and assemblage. The upper longerons 30 are substantially horizontal, although inwardly curved during their rearward extent, as is denoted by the numeral 31 of Fig. 2. This provides for a narrowing chassis, as the fuselage is required to sustain but small weight at its rearward portion. The lower longerons 32 are curved in both the vertical and horizontal planes, reaching their greatest vertical curvature at the pilot's cock-pit, and having a horizontal curvature equal to that of the upper longerons. Vertical struts 33 connect pairs of upper and lower longerons and horizontal struts similarly connect both upper and both lower longerons. Fuselage wing posts 34 and 35 are erected at a forward inclination and upon each side of the fuselage, the forward posts 35 marking the termination of the shorter upper longerons although the lower longerons are extended therebeyond to form the basis for the engine section.

At their forward extremities, the lower longerons 32 support a draft frame 36 through the medium of the integral and attached ears 37 of the latter. Draft bars 38 are also connected at their forward terminals to the pairs of ears 37 and extend rearwardly for connection to the forward wing posts 35, at the point of intersection therewith of the longerons 30. Forward and rear posts 39 and 40 are maintained in alinement with respective fuselage wing posts and carry the engine section panel 41 of the aeroplane's supporting surfaces. The upper terminals of the rear posts 40 and the lower terminals of the fuselage wing posts 34 are each connected by bracing wires or cables 42 to the respective forward extremities of the upper longerons 30. Clips 43 are employed at the intersection of each longeron 30 with a forward fuselage wing post 35, draft bar 38, engine panel post 39, and wires 42. As is illustrated in detail in Fig. 9 a pair of clip faces 43, in this fitting, are connected by walls 44 which fit over the longeron terminal. Forwardly projecting ears 45 are complementally formed on the clip faces to mount the rearward terminal of each draft bar 38, while a similar pair of ears 46 carries an I-bolt to which is connected the upper terminal of a bracing wire 47 extending forwardly for a bracing function to be later more fully set forth. A third pair of complementary ears 48 are projected downward and connected with the upper terminal of the fuselage wing post 35. A diagonally and rearwardly extending pair of ears 49 mount one terminal of the lowermost bracing wire 42, the uppermost wire being supported by an I-bolt suitably arranged between the socket portions 50 of the clip faces 43, the forward engine panel posts 39 being mounted in such socket in alinement with the respective fuselage wing post 35. A wire 42$^a$ connects with the rearward terminal of the uppermost draft wire 42, at the top of each rear wing post 40, and extends therefrom to an anchorage on the fuselage, counteracting the forward pull of this draft wire.

It is now to be pointed out that the wires 42 act as a draft yoke, the continuation of which lies along the draft bar 38. The wires 42 being respectively connected to the supporting surfaces of the aeroplane, against which acts the inertia of the machine to flying, serve to connect such surfaces directly to an assumed center of resistance, which is in turn direct-connected to the draft frame 36 through the medium of the bars 38, so that the center of thrust, lying along the propeller axis is enabled to apply the maximum tractive effort at the point where the resistance may be considered as being concentrated.

By this draft system the tractor thrust places the posts 34, 35, and 40 in compression while placing the forward panel supporting posts 39 in tension. The actual center of resistance of the aeroplane may or may not lie exactly along the horizontal strut 51 which connects the upper ends of fuselage wing posts 35, but connection of the draft bars 38 to such posts has been found to be a practical application of the draft theory discussed in the foregoing.

It is further designed by the present invention to arrange for a novel support of the engine bed, suspending the bed beams directly from the forward post 35, in completing the draft arrangement. For this proposition fuselage wing posts 35 are intermediately connected by a rod 52 (Fig. 10) which pierces the rear extremities of the engine bed beams 53. The lower terminals of the posts 35 are connected by tubular wing tie rods 54, which are receivable within shallow sockets formed in the bottom edges of these posts, such sockets being adapted to be closed by the upper edges of the longerons 32, when the posts 35 are placed in contact therewith. The entire structure is made rigid by means of clips or brackets which are carried by the wing post terminals in a manner surrounding the projecting tie rod extremities and overlapping the longerons. These tie rods or tubes are interchangeable in their position with either the forward or rear wing posts, and serve to unite the fuselage at a point where it is imperative that the lifting force upon the wings of the aeroplane be taken up by tension members of ample strength. The ends of each tie tube 54 are closed by caps 55 which are first threaded into the tubes and subsequently brazed or otherwise firmly attached. Hinges 56 are formed to outwardly project from these caps 55 to serve as points of attachment for the lower wing of the aeroplane's supporting surfaces which are thus demountable in the approved manner.

Compression collars have their substantially, cylindrical body portions denoted by the numeral 57, arranged adjacent the extremities of each tie tube, such collars being provided with back plates 58 which extend laterally beyond the tube for contact with the inner surface of the posts 35 or more properly with the plates carried at the lower terminals of such posts. An ear web 59 is formed upon the body and at right angles to the back plate 58 for the purpose of mounting upon this bracket the bracing arm 60, which is to be responsible, in conjunction with the rod 52, for the support of the engine bed posts. An angle bracket 61 forming a right angular seat for each bed beam is carried at the upper extremity of each brace 60 and the bed beams are maintained within their respective bracket seats through the medium of bolts 62, or an equivalent fastening means. Tubular spacing bars 63 maintain the engine bed beams at a constant distance from each other and from opposite fuselage posts 35, such bars surrounding the posts connecting bar 52. Laterally extending ears 64 are formed upon the collars 57 for the anchorage of suitable stay wires or cables 65 extending forwardly and rearwardly in horizontal planes.

The clip or clamping bracket connecting the longerons 32 with the forward wing posts 35 of the fuselage without necessitating piercing of the former parts consists of a pair of complementary plates which are applied to the lateral faces of each post 35 and at its lower terminal in order to project therebeyond into the lapping relation with the corresponding longeron 32 which is illustrated in Figs. 9 and 13. Each of these plates 66 is flanged laterally at right angles along its bottom edge as denoted by the numeral 67 in order to support one of the running gear post sockets, as will be presently described. These plates 66 are centrally cut away as at 68 for the passage therethrough of the terminals of the tubular support 54 and ears in complementary pairs are formed to project forwardly and rearwardly upward from the plates for the anchorage thereto of stay wires 69, which co-act with the wires 47 in bracing the engine section of the fuselage. The upper portion of the outermost clips 66 of each pair is angularly flanged in a lateral direction and apertured for the anchorage of stay wires connecting to the demountable wings of the aeroplane.

Forwardly the engine bed beams 53 are supported by the draft plate 37, while struts 70 of a plate formation serve to intermediately support the beams, in conjunction with braces 71 which are connected to the central portion of the draft bars 38. The engine, denoted by the numeral 72 is mounted upon these bed beams in any approved manner, having its driven shaft projecting forwardly through the draft plate frame for the carriage of a tractor. The wires 69 and 47 cross each other and are anchored at respective extremities of the draft bar strut 71. Lift and drift wires are denoted collectively by the numeral 73, serving to brace the successive fuselage sections defined by intersection with the upper and lower longerons of the vertical and horizontal struts 33, according to the well known fashion which forms no part of the subject matter of this invention.

A radiator 74 forwardly abuts the draft frame and is braced to the upper terminals of the fuselage wing posts 35 by bars 75. A hood 76 for the motor 72 is supported by this radiator, and the inclosure of the engine section is completed by the addition of side and bottom cowls 77 and 78 respectively. Continuing the streamline formation of the engine section is a main pit cowl 79, the continuity of which is broken only for the provision of an observer's cock-pit 80 and a pilot's cock-pit 81, the former being immediately behind the fuel tank 82 which is placed within the engine section in juxtaposition to the motor. In the pilot's cock-pit is situated a control of the Deperdussin type having the aileron controlling wheel 83 revolubly mounted on the swinging lever 84 which in turn controls movement of the elevator, or "flipper" 85 carried at the rear of the fuselage. The usual rudder 86 is also pivoted on a vertical axis to the tail post 87 and may be controlled by operation of the foot lever 88, also situated in the aft cock-pit. The tail of the fuselage is equipped with the vertical fin 89 and the horizontal stabilizer 90 of well known application, a fuselage cover 91 serving to deck over the distance between the main pit cowl 79 and the rear planes. A skid 92 is fulcrumed to depend from the tail post 87 and is connected to the fuselage by means of a shock absorbing attachment which will be later set forth in detail.

Attention will now be directed to the specific structure of certain clamp or socket fittings employed by this invention to mount or connect various posts, struts, longerons and other wooden parts of the fuselage, supporting surfaces, and running gear. In this connection reference will first be made to Figs. 14–17, inclusive, in which there is illustrated the socket connecting the running gear beams or braces to the fuselage. The socket is denoted as a whole by the numeral 93 including a base plate 94 and a socket 95 mounted thereon in the angular laterally-directed fashion illustrated. The base plate is of such configuration as to mate with the flanges 67 formed upon the lower edges of the plates 66 serving to connect fuselage posts 35 with the lower longerons. These flanges and the socket base plate are provided with registering apertures for the reception of bolts 96 or a similarly suitable attaching means, thus obviating the necessity of direct connection of these running gear post sockets to the longerons, at the same time, gaining in strength.

The socket 95 is of the streamline ovoidal shape necessary for snug reception of a running gear post or beam 97, and is formed with depending tabs or ears 98 which extend longitudinally along the beam beyond the limits of the body of the socket, and are connected by a fastening bolt 99 or equivalent means extending through the thicker portion of the post 97, such tabs being formed adjacent the forward portion of the socket particularly for this purpose. Provision for the attachment of bracing wires or cables 100 is made by forming the ear 101 integral with the base 94, and then flanging it downward. Preferably an ear brace 102, of angular plate construction has one flange secured to the socket and extends under the ear 101 to assist in supporting the latter. For the purpose of attaching the socket 95 to the base plate, ears 103 are integrally struck up from the surface of the plate, and are then flanged into the plane of the lateral socket surface opposite the point of securement of the brace plate 102. Desirable fastening means 104 serve to connect the socket to its base through the medium of these ears and the mentioned brace.

The running gear posts 97 are six in number, three connecting to each of the lower fuselage longerons through the medium of a socket of the character just described. One of the posts 97 is supported under each of the fuselage wing posts 34 and 35, while the remaining running gear posts for each longeron have their sockets arranged in alinement with the intermediate draft bar and engine bed braces 70 and 71. The two rearward posts 97 on each side of the running gear are connected by the angle or fork bracket 105, while the forward post is connected to the jointed rearward posts by the skid or bar 106 which carries a bracket 107 provided with a vertical slot 108 in which is movable the axle 109 connecting opposite beams 106. Wheels 110 are carried at the extremities of this axle and are preferably rubber-tired, shock absorbing devices being interposed between the axle and each beam 106 in order to resist downward movement of the running gear brackets 107 with respect to the axle, as would be the case were the aeroplane to make a heavy landing.

The fitting to be next taken up is the clamp bracket employed in connection with the particular type of longerons illustrated in Figs. 2–8 inclusive, such bracket being adapted to have a practically universal application for the whole length of the longerons for the purpose of securing thereto the vertical and horizontal fuselage struts. For this purpose the longerons have been made of uniform overall dimensions throughout their rearward portion, although there also remains the necessity of having the engine section portions of the longerons comparatively heavy, to withstand the strain expected to be laid upon them, and the necessity of lightening the rearward construction of the longerons as much as possible, as it would be most inadvisable and unnecessary to provide a heavy tail for the aeroplane.

To meet all these conditions the forward portions 111 of the longerons are formed relatively thick and are abruptly tapered off, immediately abaft the engine section of the fuselage in the manner denoted by the numeral 112, attaining a uniform overall thickness 113 throughout the remainder of the length. This construction permits of the universal application of a clamp or clip throughout the rearward length of any longeron. Forwardly of the engine section these clips are not employed, their function being sustained by the brackets 43 previously described as connecting the fuselage wing posts 35 with the longerons and with the horizontal struts. For accomplishing lightening of the longerons rearwardly without losing their uniform perimetral dimensions in cross section, each longeron is laterally channeled in the manner indicated by the numeral 114, such channels occurring between the points of connection to struts only and being spaced by unchanneled stations 115 to which the struts are to be clamped by the universal fitting. Progressing rearwardly these channels 114 gradually increase in depth as is well illustrated in Figs. 6 and 8. By the longeron construction thus evolved all of the previously stated conditions are successfully fulfilled.

For use in connection with the uniformly dimensioned longeron portions there is provided the universal fitting illustrated in Figs. 18–24 inclusive. Referring primarily to Figs. 21 and 23 in which the blank and bent up forms of the clip are illustrated *per se*, the numeral 116 includes the diamond-shaped clamp portion of the blank, the overall axis of the diamond being equal to twice the width of one longeron side, as this clamp portion is designed to embrace the two outer sides of each longeron. The numerals 117 denote the clip portions of the fitting which are formed integrally with the clamp portion and at the extremities of the major axis thereof. The clamp portion embraces the longeron and the clip or socket portions engage the abutting extremities of the struts to be fastened to the longeron. A single blank of sheet metal is capable of including this clamp as an entirety, such blank being initially of rectangular shape before stamping or cutting out the clamp and clip portions. The fitting as a whole, however, is made up of three separate portions as will be later more fully specified.

Upon the opposite sides of the clip body portions 117 are carried socket forming plates 118 which are separated from the members 117 by bending lines 119, about which these plates are adapted to be given a one quarter turn for the purpose of assuming a parallel alinement defining a socket for the reception of strut terminals 120. At their outer extremities the plates 118 are each formed with an elongated aperture 121 through which fastening means 122 are adapted to extend for the attachment of the sockets to the strut. Substantially semicircular ears 123 are formed upon one edge of each plate 118 and separated therefrom by a bending line 124 about which the ears are adapted to be flanged for engagement with a face of the strut terminal joining the face to which the plate is attached as will be readily apparent from an inspection of Fig. 18.

Bending lines 125 separate each of the clip portions from the extremities of the diamond shape clamp, and a bending line 126 coincides with the minor axis of the diamond. When the fitting is shaped up, the bending lines 126 engage the outermost corner 127 of the longeron, reference being had to Fig. 18, while the bending lines 125 engage the corners 128 adjacent to the outermost corner, the clamp thus overlying two adjacent faces of the longeron, being applied at one of the unchanneled portions 115 thereof. The clip portions of the fitting accordingly overlie the remaining faces of the longeron, the socket plates being bent up at right angles thereto in the manner illustrated to advantage in this figure. The strut socket is therefore readily defined by the plates 118, which form two sides, and by the ears 123 which together form a third side of the socket.

It now remains to describe, in connection with the clamp portion of this fitting, the anchor plates employed to coact therewith. Figs. 22 and 24 show respectively the blank one of these plates and the bent up form of the blank. Three sides of a body portion 129 of this plate are elongated, to provide respectively an ear 130 and a pair of alined arms 131, which in turn are enlarged at their terminal to provide anchoring ears 132, each of these ears 132 is provided with an aperture 133, while the ear 130 has the larger aperture 134. For lightness without loss of strength the body of the plate may also be apertured, this being pointed out by the numeral 135. Bending lines 136 define the outline of the body portion 129 of the plate in separating the ear and arms therefrom.

When bending up this anchor plate the arms 131 are flanged at a slight forward angle away from the body as is true also of the ear 130. One of these plates is then secured upon the extremities 117 of the clamp portion of the fitting, by brazing or a similarly desirable means of attachment, thus completing the three part construction of the fitting. As shown in Fig. 19, then, the ears 130 of adjacent plates will be in parallel relation for the reception of a bolt 137 therebetween, forming an anchorage on the upper terminal of brace wire 138. These ears also complete the definition of the strut socket by occupying the fourth side thereof in the manner shown. The horizontal extending ears 132 similarly receive lift or drift wires or cables 139 which are passed through the apertures in said ears and then locked in the manner shown or twisted as desired. These wires 138 and 139 are merely particular designations, for the purpose of clarity, of the fuselage wires previously denoted by the numeral 73 as collective adjuncts of the fuselage assembly. It is to be particularly noted that the arrangement of the anchoring plates upon the extremities of the fitting and the attachment of a tension member to the projecting ears 130 of each pair of such plates, causes the latter to serve as a means for drawing the two terminal portions of the fitting toward each other, whereby the fitting and its adjuncts will be firmly bound upon the longeron.

The wing post socket employed to mount the terminals of each post connecting the supporting surfaces of the machine is illustrated in Figs. 25-28 inclusive and includes a base plate 140 at the center of which is formed a pair of spaced integral ears 141 which accommodate the removable bolt 142, or other fastening means. The edges of the base plate 140 are provided with semispherical recesses 143 through which there extend bolt apertures 144. Three of the sides of the base plate have formed centrally thereon lugs or ears 145 which are centrally apertured as at 146. The remaining base plate side has similarly formed the double lug 147 provided with a pair of apertures 146. All of the lugs are flanged upwardly from the bottom of the plate in order to make alined connections with clevises 148 which are removably engaged with the respective ears through the medium of bolts, pins, or studs 149. These clevises are carried on the extremities of threaded rods with each of which there engages an adjusting device such as a turnbuckle 150, a tension member leading to the desired stay-point from the turnbuckle. Bolts 151 are adapted to extend through the base plate apertures 144 and into exterior contact with the wing spar in order to mount the socket securely upon the wing, being connected by a washer plate (not shown) on the under surface of the spar, if so desired. The heads of the bolts 151 are formed with semispherical enlargements adapting them to oscillatably seat within the similarly shaped recesses surrounding the bolt apertures, in order to mount the socket for adjustment.

The means supporting the terminal of a wing post 152 within the socket just described include a post socket 153 which engages the reduced terminal of the post by the arms 154 extending upwardly for the connection of means indicated at 155. An ear 156 is carried by the socket 153 and is adapted to extend between the spaced body plate ears 141, the ear 156 being provided with a center aperture 157 which arcuately increases from the middle to each end, in order to provide play for partial rotative movement of the wing plate about an axis at right angles to the axis of the bolt 142, which permits rotation transversely of the wings.

It will be obvious from the foregoing that rotational movement of the wing post about the bolt 142 shown in Fig. 26 will permit adjustment of the stagger between the biplane wings, that is the amount of advance accorded the upper wing over the lower.

In the same manner rotational movement of the wing post with respect to the socket plate longitudinally of the wing, as shown in Fig. 25 will permit an adjustment of the dihedral angle between the wings on opposite sides of the fuselage. The socket plate 140 may be said to be truly universal in its application, since it carries ears on all four of its edges, although three ears only are used in any one installation. As shown in Fig. 27 the forward ear 145 has been struck off from the body plate before the application of the socket to the wing post, as there is no necessity for its employment with a forward wing post. If it had been wished, however, to adapt the socket plate to a rear wing post, the ear 145 opposite that one shown as struck off in Fig. 27 would have been removed in its stead, thus leaving the socket free for connection by tension members in the three directions desired.

There now remains to disclose, as a particular feature of the present fuselage construction, the manner of mounting the rear skid 92 upon the tail of the aeroplane in such manner that it will be equipped to absorb all the shocks incident to an ordinary landing of the machine after flight. In this connection attention is directed to Figs. 29 and 30, the former showing the manner in which the longerons of the fuselage are connected to the tail post 87 upon the lower extremity of which is pivotally mounted by socket means 158 an intermediate portion of the skid 92. Forwardly the skid is upturned in the customary manner as is indicated by the numeral 159, and carries upon this the curved forward portion a clip 160 which is U-shaped and encompasses the sides and bottoms of the skid, its terminals being formed with angular lugs or ears 161. Each of these lugs is apertured to loosely accommodate the V-shaped shackle 162 the extremities of whose arms are removably connected by suitable bolt means. A lug 163 similar to the lug described upon clip 160 depends from the adjacent fuselage fitting 164 which differs from the typical fitting 116 only by reason of the provision of this ear, the latter also carrying one of the shackles 162. A cylinder or ring of some such elastic material as rubber is denoted by the number 165 and is adapted to have its edges embraced by the terminals of the V-shaped shackles 162, wherein it is maintained through the medium of the bolts 166 carried by such shackle arms. These bolts are covered with a suitable fabric 167 adapted to relieve them of all direct contact with the elastic rings 165, in order to reduce the otherwise inescapable friction to a minimum. A resilient support is thus arranged for each of the skid clip ears 161, so that the skid may have its forward portion yieldably swung beneath the fuselage. For this reason any blow upon the shorter end of the skid as the machine comes in contact with the ground will cause the curved upper end 159 to move in such fashion as to exercise the resiliency of its suspension, accordingly absorbing the shock of landing which would otherwise be transmitted directly to the fuselage. A buffer bar 168 connects the lower longerons 32 immediately over the inner terminal of the skid, so that any blow upon the longer side of the skid, as respects its fulcrum 158 will not be able to drive the skid upwardly into the fuselage, to do damage to the struts and lift and drift wires, until this bar has first been demolished.

In all of the foregoing there has been disclosed a fuselage construction which is capable of attaining the objects previously presented. The fittings employed at various points along the longerons to connect thereto the struts, the fuselage wing posts, and the running gear braces afford a lighter and stronger structure than has hitherto been evolved. Lighter, because the wooden parts need not be made of an extra thickness in order to be able to withstand the weakening effects transmitted thereto by piercing them for the many connections. Stronger because the connections between the wooden parts are never open to destruction through the setting up of splitting stresses, to any such degree as was formerly the case. Where bolts have been employed, or fastening means of a nature demanding piercing of the wooden parts, these are permitted by this invention to be of much smaller sizes than would otherwise be necessary. Greater strength is also an important function of the draft system, since the bars 38 not only rigidly connect and reinforce parts subject to great strain, but also transmit the forward thrust of the tractor directly to the point where its application is most desired, a saving not only in the power otherwise disseminated from its point of prime usefulness but also in elimination of unnecessary strains upon parts not so well adapted to withstand them. The provision of the universal clips of the fuselage connecting the struts to the longerons, and the complementary arrangement of each longeron as of a uniform cross section throughout that portion of its length to which the clips are applicable, greatly cheapens manufacturing costs with a consequent strengthening of these important connections. Moreover the machine as a whole having its lifting strains, its driving strains and its ground-running strains tied to a single portion of the fuselage (that defined by the fuselage wing posts) provides a simplified aeroplane construction which in assemblage has all of the advantages previously enumerated.

While in the foregoing, however, there has thus been illustrated in the drawings and described in the specification, such combination and arrangement of elements as constitute the preferred embodiment of this invention, it is nevertheless desired to emphasize the fact that such amendments to these disclosures may be made in the matters of proportion and degree, for later adaptations of this present aeroplane construction as fall within the scope of the appended claims.

What is claimed is:

1. In an aeroplane, a fuselage, posts defining a certain section of said fuselage, and means individually tying each of such ordinary aeroplane elements as supporting surfaces, running gear, and the power plant, directly and commonly to said fuselage section.

2. In an aeroplane, wing posts, a power plant, supporting surfaces, running gear, means connecting said power plant to certain of said posts, and means individually connecting said surfaces and gear to each of said posts.

3. In an aeroplane, wing posts, supporting surfaces, posts connecting the surfaces to said wing posts, a power plant, means connecting the power plant to said wing posts, intermediate bracing means for the said connecting means, running gear, and means connecting the running gear separately to each wing post and each of said bracing means.

4. In an aeroplane fuselage, posts, aerial surfaces supported above and below said posts and stays connected to separate surfaces and commonly united upon respective posts to form a draft yoke between the latter and said surfaces.

5. In an aeroplane fuselage, posts, aerial surfaces supported above and below said posts and stays connected to the rear edges of said surfaces and converging forwardly to an intermediate anchorage upon respective posts, to form a draft yoke between the latter and said surfaces.

6. In an aeroplane fuselage, forward and rear wing posts, supporting surfaces, and stays arranged in pairs to connect rear edges of said surfaces to corresponding forward posts.

7. In an aeroplane fuselage, a draft system including a power plant, a frame to receive the pull of said power plant, supporting surfaces offering some resistance to forward progress, posts in the fuselage serving to concentrate such resistance and means yoking each surface and said frame to said posts.

8. In an aeroplane fuselage, a draft system including a power plant, aerial surfaces above and below the fuselage offering a certain resistance to forward progress, fuselage posts, means supporting said surfaces upon and connecting them to said posts, draft bars between said frame and said posts to concentrate the pull of said power plant and a draft yoke continuing each bar for direct action upon said surfaces from the posts.

9. In an aeroplane fuselage, a draft system including a power plant, a frame to receive the pull of said power plant, supporting surfaces offering a certain resistance to forward progress, posts in the fuselage serving to concentrate such resistance, bars connecting the frame rigidly to said posts, a draft yoke continuing each bar to respective surfaces and means tying certain of the surfaces back to the fuselage opposite to said yokes.

10. In an aeroplane fuselage, upper and lower longerons, a draft frame supported at the forward ends of said lower longerons, posts connecting the upper and lower longerons at the forward ends of the former, draft bars extending between the forward ends of the upper and lower longerons for connection of said frame and posts, and an engine bed supported at its extremities by said frame and posts.

11. In an aeroplane fuselage, upper and lower longerons, the latter extending beyond the former, forward and rear fuselage posts, wing posts erected on the fuselage posts, draft rods connecting the forward extremities of the upper with the lower longerons, a draft yoke continuing from each bar to connect respective rear fuselage posts and rear wing posts thereto, and back stays tying said rear wing posts to said fuselage.

12. In an aeroplane fuselage, a draft system including fuselage post anchorages located approximately in the horizontal plane of the center of resistance, a power plant determining an axis of pull out of alinement with the plane of said anchorages and a rectilinear draft member rigidly connecting said power plant with said posts to join said axis of thrust directly to the center of resistance.

13. In an aeroplane fuselage, a draft system including fuselage post anchorages embracing a center of resistance, supporting surfaces yoked to a point located approximately at said center of resistance, a power plant determining an axis of thrust removed from said center and a tension bar connecting said power plant to said post anchorages, and consequently connecting the axis of thrust and center of resistance.

14. In an aeroplane fuselage, a draft system including fuselage posts embracing a center of resistance, supporting surfaces, stay wires arranged to converge in pairs to yoke said surfaces to the posts, a power plant determining an axis of thrust and a draft bar directly connecting said power plant with each post at the point on the latter reached by respective yokes, in order to transmit the thrust and the resistance of the surfaces direct to said center.

15. In an aeroplane fuselage, upper and lower longerons, wing posts, supporting surfaces carried by the posts, bars rigidly connecting the forward ends of upper and lower longerons, a draft yoke connecting each bar to the supporting surfaces and a back stay leading from one of the surfaces to said fuselage opposite to each corresponding yoke.

16. In an aeroplane fuselage, longerons, wing posts, engine bed beams, means supporting one end of each beam upon certain of the posts and means rigidly suspending the other end of each beam from the same posts.

17. In an aeroplane fuselage, wing posts, engine bed beams, bars mounted by said posts to support one end of each beam, and bars suspended by the post for rigid connection to the other end of each beam.

18. In an aeroplane fuselage, longerons, fuselage posts arranged between pairs of longerons, bars connecting the posts, engine bed beams and means supporting said beams on one of said bars and for bracing said beams from another of the bars.

19. In an aeroplane fuselage, posts, engine bed beams, a draft frame to support one end of each beam, bars inclined from the frame to the posts, and bars inclined from the posts to the other ends of said beams.

20. In an aeroplane fuselage, posts, engine bed beams, a draft frame supporting one end of each beam, bars inclined longitudinally of the fuselage to connect the frame to the tops of said posts and bars inclined transversely of the fuselage from the bottoms of said posts to support the other ends of said beams.

21. In an aeroplane fuselage, posts, engine bed beams, a bar joining the posts, brace bars carried by first said bar, a socket seat formed on each brace bar to receive a beam, a rod connecting posts and beams, and elements arranged on the rod to space the several beams and posts from each other.

22. A wing tie tube for aeroplanes, including a main body tube, abutments carried adjacent the extremities of the tube and hinges extending from the ends of the tube.

23. A wing tie tube for an aeroplane, including a main body tube, an abutment carried adjacent each end of the tube, a support pivoted to each abutment, and tension wiring ears associated with each abutment.

24. In an aeroplane fuselage, a wing post provided with an edge-socket, a longeron closing the socket of said post, a tie tube received in the socket and means overlappingly joining the post and the longeron, and surrounding said tube.

25. In an aeroplane fuselage, the combination with the engine bed supports of the fuselage, of a wing tie tube, compression collars carried adjacent the extremities of said tube, a web formed on each collar and an arm pivoted to each web and extending therefrom for the support of said engine bed supports.

26. In an aeroplane fuselage, longerons having a uniform overall perimeter, said longerons being channeled toward one end without departure from the uniform perimetral dimension.

27. In an aeroplane fuselage, longerons having a portion of uniform overall perimeter and a portion of relatively increased perimeter formed thereon, and channels in said uniform portion, said channels being spaced from each other and of various depths.

28. In an aeroplane fuselage, longerons having a uniform overall perimeter, said longerons being channeled in a manner preserving the uniform perimetral dimension, and fittings for the longerons universally interchangeable at all points thereon.

29. In an aeroplane fuselage, longerons having a uniform overall perimeter, channels of varying depths provided in said longerons at intervals affording solid stations of an equal perimeter and fittings adapted to be clampingly seated upon the longerons, and being universally interchangeable along said stations.

30. In an aeroplane fuselage, longerons, struts, fittings to connect longerons and struts, a clamp portion of each fitting embracing its longeron, and socket portions formed at the extremities of said clamp portion for reception of strut terminals, each socket including lateral plates and lugs bent into a common alinement from respective plates.

31. In an aeroplane fuselage, longerons, struts, fittings to connect the longerons and struts, a clamp portion for each fitting embracing the longeron, and socket portions formed on the extremities of the clamp portion for the reception of strut terminals, each socket including a pair of integral plates, lugs bent into common alinement from respective plates and an ear projecting from the back of said socket portion to complete the socket.

32. A fuselage fitting for aeroplanes including a longeron clamping portion, strut clip portions formed at the extremities of the clamp portion and separated therefrom by bending lines, socket plates oppositely carried by each clip portion and separated therefrom by bending lines, and an ear carried by each plate and adapted to be bent at right angles thereto and to the adjacent clip portion.

33. A fuselage fitting for aeroplanes including a longeron clamp portion, a strut clip portion formed at each extremity of the clamp portion and separated therefrom by bending lines, plates and ears carried by said clip portions and adapted to be bent up to define a socket and members adapted to be secured to each clip portion and to project beyond the socket formed thereon in a plurality of directions.

34. A fuselage fitting for aeroplanes including a longeron clamp portion, strut clip portions carried by the clamp portion and adapted to be bent therewith to embrace the longeron, plates and ears formed upon each clip portion to incompletely define a strut socket and members adapted to be secured to each clip portion for projection therebeyond in a number of directions, one of which directions completes the definition of the adjacent socket.

35. In an aeroplane fuselage, longerons, struts, fittings to connect the longerons and struts, each fitting including a clamp portion to embrace the longeron, socket portions formed on the extremities of the clamp portion for the reception of strut terminals, three-way anchor plates secured to the back of each socket portion, adjacent plates having ears in parallelism, a bolt connecting the parallel ears and a tension member connecting to said bolt to bind said fitting upon the longeron.

36. In an aeroplane fuselage, longerons, struts, fittings to connect the longerons and struts, each fitting including a single member, having embodied therein a clamp portion and integral socket portions adapted to be bent up at the terminal of the clamp portion and also including a pair of similar members arranged for attachment to the socket portions of said single member, each of second said members having a pair of arms extending beyond the respective socket portion and an ear aiding to define the socket of such portion.

37. In an aeroplane fuselage, clips engaging longerons of the fuselage, ears formed on respective clips to converge below the fuselage, a skid mounted below the fuselage at the convergence of said clip ears and means resiliently linking the skid to each of the ears converging thereto.

38. In an aeroplane fuselage, a tail post, a skid fulcrumed upon said post, shackles loosely connected to said skid and diverging toward spaced points on the fuselage, shackles loosely dependent from the designated fuselage points and means resiliently linking corresponding skid and fuselage shackles for the suspension of said skid upon its fulcrum.

39. In an aeroplane fuselage, a tail post, a skid fulcrumed on said post, a U-shaped slip embracing a portion of said skid, an ear formed on each arm of said clip and flanged away from the skid, and shackle means engaging the ears for suspension of the skid beneath said fuselage.

40. In an aeroplane fuselage, a tail post, a skid fulcrumed upon said post, a clip carried by said skid and formed with projecting ears, fuselage fittings, formed with similarly projecting ears, a shackle loosely mounted in each ear, a resilient ring connecting adjacent pairs of shackles in yieldably swinging said skid below said fuselage, and means reducing the friction between said rings and respective shackles.

41. In an aeroplane fuselage, a tail post, a skid fulcrumed on said post, a U-shaped clip embracing the skid, apertured ears projecting from the arms of the clip, a pair of fuselage clips, an ear formed on each fuselage clip to correspond to one arm of the skid clip, and means connecting corresponding ears to afford the skid a V-shaped resilient suspension from said fuselage.

42. In an aeroplane, supporting surfaces, wing posts, a socket connecting the terminals of each wing post to the surfaces, a body plate for the socket, central ears carried by said plate, a wing post ear, provided with a transverse boring increasing from the center to the ends, and bolt means entering said boring and carried by the plate ears to mount each wing post for oscillation in two directions.

43. In an aeroplane, supporting surfaces, wing posts, a socket to connect the terminals of each post with the surfaces, said socket including a plate adapted to have a three-way connection from one surface to another and ears flanged up from said plate in more than three directions whereby provision is made for the designated threeway connection in any position of said plate.

44. In an aeroplane, supporting surfaces, wing posts, a socket to connect each terminal of a post with a surface, said socket including a plate having a duplex connection and multiple single connections from one surface to another, a duplex ear formed thereon and single ears also formed on said plate in numbers exceeding the quantity of said single connections whereby all of said connections may be arranged without alterations of the socket plate in any position of the latter.

45. In an aeroplane wing post socket, a plate, spaced ears projecting from the plate, a socket engaging the wing post terminal, arms formed on the socket to embrace the post and for connection therethrough, an ear carried by the socket for loose reception between the ears of said plate, and means mounting the ears for relative oscillation in two directions.

46. In an aeroplane, the combination with a wing spar and a wing post of means for adjustably mounting the post upon the spar, said means including a plate, ears formed on the plate, a socket engaging the post terminal, means mounting the socket in said plate ears, and bolts extending through said plate and on the exterior of said spar for attaching the plate to the latter.

47. In an aeroplane, the combination with a wing spar and a wing post of means for adjustably mounting the post upon the spar, said means including a plate, ears formed on the plate, a socket engaging the post terminal, a socket ear mounting the terminal socket between said plate ears, bolts in lateral contact with the spar for attaching the plate thereto, a bearing enlargement formed on each bolt head, and means oscillatably seating the bolt heads in said plate.

48. In a fuselage for aeroplanes, the combination of fuselage posts, a wing tie tube connecting the post extremities, a tie rod intermediately connecting the posts and bracket arms hinged to said tube for an oblique intermediate connection with said tie rod.

49. In a fuselage for aeroplanes, the combination with fuselage posts, a tie tube connecting bottom terminals of the posts, a tie rod intermediately connecting the posts, engine bed beams having their inner extremities spaced upon said rod, means supporting the inner ends of the said beams from the bottom of said fuselage posts and means connecting the outer ends of said beams to the top of said posts.

50. In an aeroplane fuselage, the combination with fuselage posts formed with socket recesses along one edge, of a tie tube having its extremities accommodated in the post recesses, a longeron closing each post recess, a frame supported by the longerons and engine bed beams supported at respective extremities upon said frame and said tube.

51. In a fuselage for aeroplanes, the combination with fuselage posts formed with socket recesses, a tube accommodated in such recesses, longerons abutting the posts to close said recesses, an engine frame supported upon said longerons, brace arms carried by said tube, engine bed beams supported upon said brace arms and said engine frame and draft bars directly connecting said engine frame back to said posts.

In testimony whereof I affix my signature.

HENRY KLECKLER.